(12) United States Patent
Czyszczewski et al.

(10) Patent No.: US 6,992,789 B2
(45) Date of Patent: Jan. 31, 2006

(54) METHOD, SYSTEM, AND PROGRAM FOR MANAGING A MULTI-PAGE DOCUMENT

(75) Inventors: Joseph Stanley Czyszczewski, Longmont, CO (US); Ravishankar Rao, Westchester, NY (US); James Thomas Smith, Boulder, CO (US); Gerhard Robert Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 09/882,243

(22) Filed: Jun. 15, 2001

(65) Prior Publication Data

US 2002/0191220 A1 Dec. 19, 2002

(51) Int. Cl.
*G06F 15/00* (2006.01)
(52) U.S. Cl. .................... 358/1.18; 358/1.15; 358/448; 358/462; 382/176
(58) Field of Classification Search ............... 358/1.18, 358/462, 448; 385/176
See application file for complete search history.

(56) References Cited

U.S. PATENT DOCUMENTS

| | | | | |
|---|---|---|---|---|
| 4,668,995 A | * | 5/1987 | Chen et al. ................ | 382/272 |
| 5,073,953 A | * | 12/1991 | Westdijk .................... | 382/176 |
| 5,202,933 A | * | 4/1993 | Bloomberg ................ | 382/176 |
| 5,225,911 A | * | 7/1993 | Buckley et al. ........... | 358/296 |
| 5,239,390 A | * | 8/1993 | Tai ........................... | 358/3.26 |
| 5,313,309 A | * | 5/1994 | Tai et al. .................. | 358/3.21 |
| 5,341,224 A | * | 8/1994 | Eschbach .................. | 358/3.27 |
| 5,343,309 A | * | 8/1994 | Roetling ................... | 358/3.07 |
| 5,379,130 A | * | 1/1995 | Wang et al. ............... | 358/462 |
| 5,485,568 A | * | 1/1996 | Venable et al. ........... | 715/500 |
| 5,506,699 A | * | 4/1996 | Wong ........................ | 358/3.08 |
| 5,568,571 A | * | 10/1996 | Willis et al. ................ | 382/254 |
| 5,602,974 A | | 2/1997 | Shaw et al. ................ | 358/1.15 |
| 5,617,485 A | * | 4/1997 | Ohuchi et al. ............. | 382/176 |
| 5,625,460 A | | 4/1997 | Tai ............................ | 358/1.14 |
| 5,694,224 A | * | 12/1997 | Tai ............................ | 358/3.01 |
| 5,710,577 A | | 1/1998 | Laumeyer .................. | 345/548 |
| 5,710,827 A | | 1/1998 | Perumal, Jr. et al. ...... | 382/167 |
| 5,742,703 A | * | 4/1998 | Lin et al. ................... | 382/176 |
| 5,754,684 A | * | 5/1998 | Kim .......................... | 382/176 |

(Continued)

OTHER PUBLICATIONS

Rao, A.R., F. Mintzer, G. Thompson, "Descreening Printer-ready Images", IS&T's NIP 14: 1998 International Conference on Digital Printing Technologies, ©1998, IS&T, pp. 285-289.

(Continued)

*Primary Examiner*—Joseph R. Pokrzywa
*Assistant Examiner*—Mark Milia
(74) *Attorney, Agent, or Firm*—David W. Victor; Konrad Raynes & Victor LLP

(57) ABSTRACT

Provided is a method, system, and program for managing a multi-page document. A plurality of input files are received including digital representations of multiple pages of a document. The content of each entire page is represented in a first representation format. The entire page content is capable of including content of a first content type and second content type. For each page of the document represented in the input files, a determination is made of regions in the page including content of the second content type. Each determined region in the page is processed to generate the content for each region in a second representation format. The content of the entire page in the first representation format and the content of each region in the second representation format is added to at least one output file. The output file is then stored.

45 Claims, 5 Drawing Sheets

U.S. PATENT DOCUMENTS

| | | | |
|---|---|---|---|
| 5,845,058 A | 12/1998 | Shaw et al. | 358/1.15 |
| 5,859,956 A | 1/1999 | Sugiyama et al. | 358/1.13 |
| 5,862,305 A | 1/1999 | Girmay et al. | 358/1.2 |
| 5,881,213 A * | 3/1999 | Shaw et al. | 358/1.15 |
| 5,956,157 A | 9/1999 | Tai | 358/3.24 |
| 6,002,847 A | 12/1999 | Silverbrook | 358/1.17 |
| 6,020,897 A | 2/2000 | Carlsen et al. | 345/629 |
| 6,049,390 A * | 4/2000 | Notredame et al. | 358/1.15 |
| 6,064,397 A * | 5/2000 | Herregods et al. | 345/630 |
| 6,125,200 A * | 9/2000 | Warnock | 382/164 |
| 6,163,625 A * | 12/2000 | Ng et al. | 382/239 |
| 6,175,425 B1 * | 1/2001 | Khorram | 358/1.9 |
| 6,205,452 B1 * | 3/2001 | Warmus et al. | 715/500 |
| 6,307,962 B1 * | 10/2001 | Parker et al. | 382/170 |
| 6,498,660 B2 * | 12/2002 | Haltmaier | 358/2.1 |
| 6,624,909 B1 * | 9/2003 | Czyszczewski et al. | 358/1.17 |
| 6,636,899 B1 * | 10/2003 | Rabb et al. | 719/310 |
| 6,717,696 B1 * | 4/2004 | Wang et al. | 358/1.9 |
| 6,738,517 B2 * | 5/2004 | Loce et al. | 382/209 |
| 6,747,758 B1 * | 6/2004 | Nishida | 358/1.9 |
| 6,751,780 B1 * | 6/2004 | Neff et al. | 715/530 |
| 6,813,621 B1 * | 11/2004 | Taylor et al. | 707/102 |
| 2001/0021041 A1 * | 9/2001 | Suzuki | 358/458 |
| 2001/0030769 A1 * | 10/2001 | Jacobs | 358/429 |
| 2002/0044298 A1 * | 4/2002 | Kaneko et al. | 358/1.15 |
| 2002/0076107 A1 * | 6/2002 | Loce et al. | 382/209 |
| 2002/0154339 A1 * | 10/2002 | Kuo et al. | 358/3.08 |
| 2002/0178950 A1 * | 12/2002 | Delhoune et al. | 101/481 |

OTHER PUBLICATIONS

Stucki, P., "Digital Color Halftone Reproduction", IBM Technical Disclosure Bulletin, © IBM Corp., vol. 28, No. 1, Jun. 1985, pp. 438-439.

U.S. Appl. No. 09/110,900, filed Jul. 6, 1998, entitled "Method and apparatus for Repurpsoing Binary Images", invented by F.C. Mintzer, R.R. Rao, and G.R. Thompson.

* cited by examiner

FIG. 3
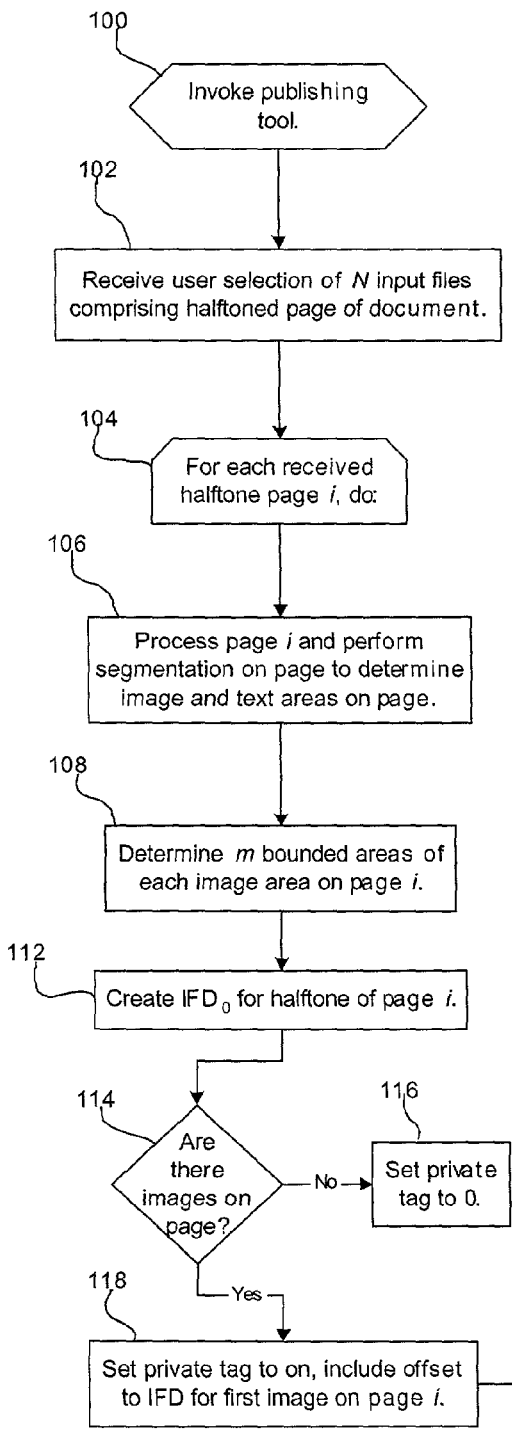
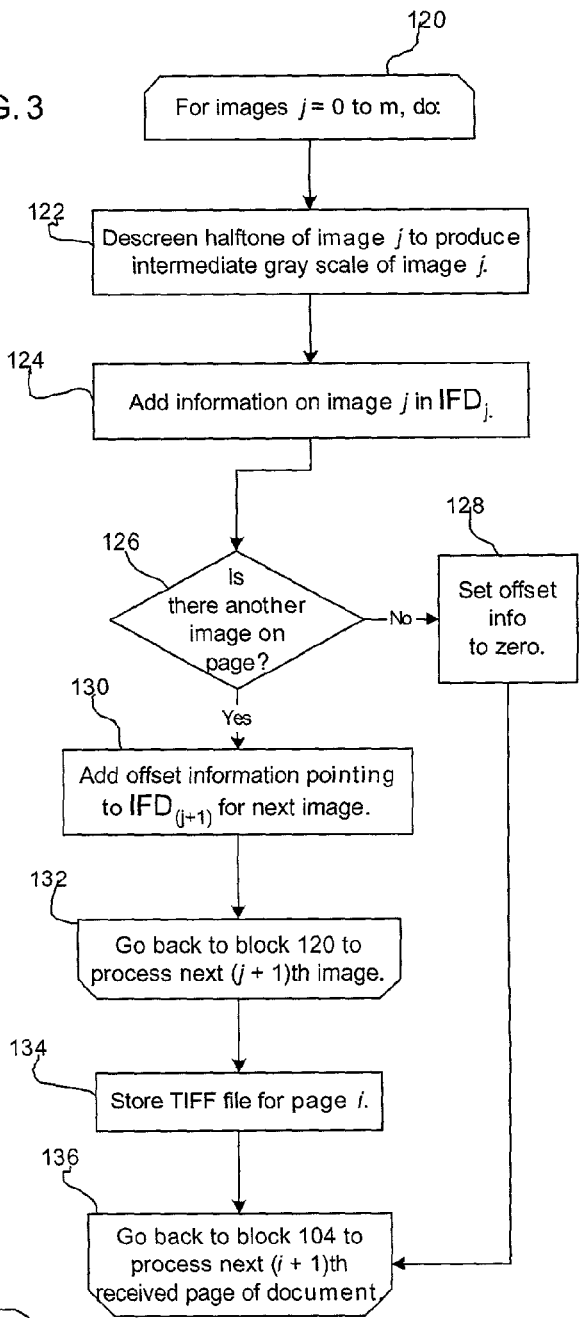

METHOD, SYSTEM, AND PROGRAM FOR MANAGING A MULTI-PAGE DOCUMENT

BACKGROUND OF THE INVENTION

1. Field of the Invention

The present invention relates to a method, system, and program for managing a multi-page document.

2. Description of the Related Art

In publishing, the pages of a document are scanned, transformed into a printer readable format, and then printed and/or archived in a computer storage device for subsequent retrieval and printing. Publishing software is used by publishing companies to electronically print and archive books. Pages of a document are scanned to produce an electronic bit-map representation of the pixels on the scanned page and the pixel color values. The page may contain line art, e.g., text and lines, and/or continuous tone, e.g., images. For black and white images, the scanned image is stored as a grey scale image wherein each pixel represented on the bit map has a corresponding shade of grey value. Optical scanners typically allow for anywhere from 16 to 256 shades of grey for each pixel. A bit map of a page that allows for grey scale values requires 4 to 8 bits for each pixel to indicate the different shades of grey. A bit map representing text only, where the pixel is either black, i.e., "on" or white, i.e., "off," only requires 1 bit per pixel to indicate either "on" or "off," black or white. A bit map that represents a color page, including line art and continuous tone, requires even more space than black and white images. Each pixel of a scanned color image can be one of 16.7 million colors, which requires 24 bits for each pixel.

After the page is scanned, the bit map produced by the scanner must be further processed into a bit map format that the printer can process. The transformation of the scanned bit map into a printer readable format is referred to as halftoning or raster image processing (RIP). In a publishing environment, halftoning or transforming, i.e., RIPping, numerous bit maps that represent the pages of a large document, such as a book, can take several hours. The result of the halftone transformation is a bi-level image, where each bit map value indicates either black or white. The halftoning transformation would use screening and dithering algorithms to produce a wide level of shades of grey or colors. Dithering refers to the illusion of printing colors or shades of grey by varying the patterns of dots. Thus, a bit map where each bit map value can correspond to one of many values indicating different shades of grey or colors is converted to a bi-level bit map where each value indicates one of two colors—black or white. However, the halftoning or transformation process uses dithering to simulate the shades of grey or different colors. The term "gray scale" as used herein refers to a bit map where each bit map value can be one of numerous values, indicating different colors or shades of grey. The term "halftone" as used herein will refer to the transformed grey scale bit map to a bit map that can be processed by the printer.

A halftone bitmap may be a bi-level bit map where there is only one value for each pixel, i.e., 0 or 1. Additionally, contone printers print a limited number of shades of a color or grey. Thus, a halftone bit map for a contone printer may include a limited number of values for each bit map value and also use dithering to simulate additional shades of grey and color. The term "halftoning" as used herein refers to the transform process of transforming a gray scale bit map to a printer readable format, such as a bi-level bit map or contone bit map capable of a limited number of different values for each pixel that are available on the printer. Halftone bit maps are typically specific to a particular printer, i.e., device dependent.

The gray scale or halftoned bit map of each page in the book may be stored in one or more files. For instance, the tagged image file format (TIFF)** stores one bit map for each page in a single file. A TIFF file can store both the gray scale bit map and a halftoned bitmap.

**TIFF and PostScript are trademarks of Adobe Systems Inc.; IBM, AIX, OS/2, and RS/6000 are registered trademarks of IBM and OS/390, INFOPRINT, and MVS are trademarks of IBM; WINDOWS is a registered trademark of Microsoft Corporation; UNIX is a registered trademark licensed by the X/Open Company LTD.

The gray scale bit map is referred to as device independent because it represents the image without reference to a specific device. The halftone bit map is device dependent as the gray scale bit map was transformed, e.g., screened or halftoned, into a halftone bit map that is particularly suited to the dithering capabilities of the printer on which the halftone bit map will be printed.

In publishing environments, to reprint copies of a book, a person will manually scan each page of a book. If there are images on a page, then the person must use a software tool to manually select the image section with the software tool and then screen the image section to produce a halftone bitmap of the image. This process of digitizing a document or book to publish is very tedious, time consuming and requires substantial labor costs.

Moreover, once the halftone is produced for one specific output device, such as a particular printer having specific characteristics, outputting that halftoned image on other printer types may produce unpredictable and undesirable output, such as moire effects. To provide optimal image reproduction, the publisher would have to rescreen the image on the page to produce a new halftone for other printers on which the document will be reproduced.

For all the above reasons, there is a need in the art to provide an improved technique for scanning and publishing books or documents in a digital printing environment.

SUMMARY OF THE PREFERRED EMBODIMENTS

Provided is a method, system, and program for managing a multi-page document. A plurality of input files are received including digital representations of multiple pages of a document. The content of each entire page is represented in a first representation format. The entire page content is capable of including content of a first content type and second content type. For each page of the document represented in the input files, a determination is made of regions in the page including content of the second content type. Each determined region in the page is processed to generate the content for each region in a second representation format. The content of the entire page in the first representation format and the content of each region in the second representation format is added to at least one output file. The output file is then stored.

Further, the first content style may comprise line art and the second content style may comprise a continuous tone image.

Yet further, the first representation format may comprise a device dependent image format and the second representation format may comprise a device independent image format. The device dependent format may comprise a halftone image format and the device independent format may comprise a grey scale image format.

In additional implementations, output files are selected for rendering. For each page represented in the selected output files, the content of the entire page in the first representation format and the content for each region in the page in the second representation format are accessed. The content for each region in the page in the second representation format is processed to generate the content for each region in the first representation format. The content for the entire page and the content for each region in the first representation format are merged into page output in the first representation format and rendered into a human observable format.

Still further, the multi-page document may be managed within a network publishing system to archive the document for later rendering on one of multiple network printing devices.

The described implementations provide an improved technique for managing digital pages of a multi-page document in a manner that is especially useful when wanting to save the multi-page document in a format that may be rendered on multiple output devices, such as different printer types. The described implementations manage the digital pages so that the output of the files sent to different printing devices is not reproduced with undesirable output effects, such as moire effects.

BRIEF DESCRIPTION OF THE DRAWINGS

Referring now to the drawings in which like reference numbers represent corresponding parts throughout:

FIG. 3 illustrates logic to generate an image file in accordance with the described implementations of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
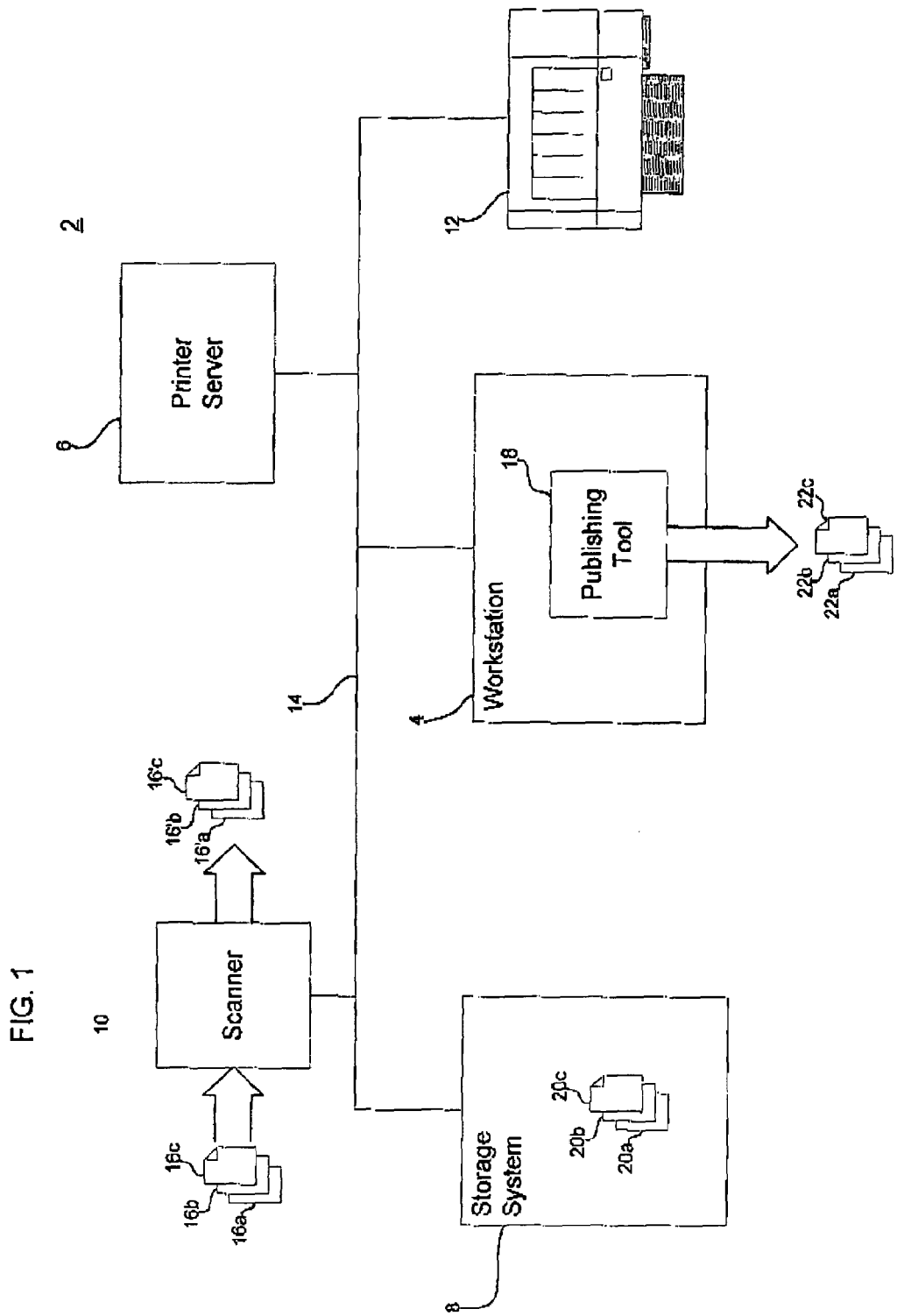
FIG. 1 is a block diagram illustrating a computing environment in which certain described implementations of the present invention are implemented.

FIG. 1 illustrates a network printing environment 2 in which preferred embodiments are implemented. A workstation 4, printer server 6, storage system 8, scanner 10, and printer 12 are all interconnected via a network 14. The scanner 10, which may comprise any optical scanning device known in the art, receives printed pages 16a, b, c including text and/or images and converts the printed pages 16a, b, c into digitized representations 16'a, b, c of the pages 16a, b, c in a gray scale or halftone format. If the pages 16'a, b, c are in a gray scale format, then each page would be represented by a bitmap data structure having one of multiple values for each bit value, e.g., 24, to represent different shades of grey, or different colors in the case of color printers. Additionally, the scanner 10 may halftone the gray scale representation of the pages 16a, b, c when producing the output pages 16'a, b, c. In such case, the output pages 16'a, b, c would be optimized for a specific printer. The scanned output pages 16'a, b, c may be stored in the storage system 8.

The storage system 8 includes digitized pages 20a, b, c including text and or images in either gray scale format, where each bit represents one of multiple values, or a halftoned image that is screened and optimized for a particular printing device. The digitized pages 20a, b, c may have been previously scanned pages or pages received from an alternative source.

The workstation 4 comprises any computing device known in the art, e.g., desktop, laptop, mainframe, server, hand held computer, etc., and includes a publishing tool 18. The publishing tool 18 is a software program that executes within the workstation 4. The publishing tool 18 receives digitized images comprising gray scale and/or halftoned bit maps of pages of text and/or images from the scanner, e.g., pages 16'a, b, c, or from the storage 8, e.g., pages 20a, b, c, and generates output pages 22a, b, c that comprise files including digital representations of the text and/or images on each input page in accordance with the described implementations of the invention. The output pages 22a, b, c may include digital representations of one or more pages of a document or book, and may be stored in the storage system 8 for later retrieval and printing.

The printer server 6 is capable of accessing the image files 20a, b, c and performing any user selected processing on such files, such as RIPping or halftoning a gray scale bit map or touch-up halftoning operations on a halftone bit map. The printer server 6 may be a separate stand alone server including an operating system such as AIX, OS/390, UNIX, OS/2, MVS, WINDOWS, etc. For instance, the printer server 6 may be implemented on the IBM RS/6000 server and include the AIX operating system and the IBM INFO-PRINT Manager software. The storage system 8 may be any suitable nonvolatile storage device, such as a hard disk drive, a direct access storage device (DASD), which is comprised of interconnected hard disk drives, a tape storage device, automated tape library (ATL), optical disk library, holographic units, etc.

**TIFF and PostScript are trademarks of Adobe Systems Inc.; IBM, AIX, OS/2, and RS/6000 are registered trademarks of IBM and OS/390, INFO-PRINT, and MVS are trademarks of IBM; WINDOWS is a registered trademark of Microsoft Corporation; UNIX is a registered trademark licensed by the X/Open Company LTD.

The printer 12 may be any suitable printer machine known in the art, including printers capable of handling large scale publishing jobs, such as printing an entire book. The network 14 may be comprised of any suitable network architecture known in the art, such as LAN, Ethernet, WAN, Storage Area Network (SAN), Token Ring, LocalTalk, TCP/IP, the Internet, Fibre Channel, etc. Alternatively, there may be separate and different networks between the devices 4, 6, 8, 10, and 12.

Figure 2:
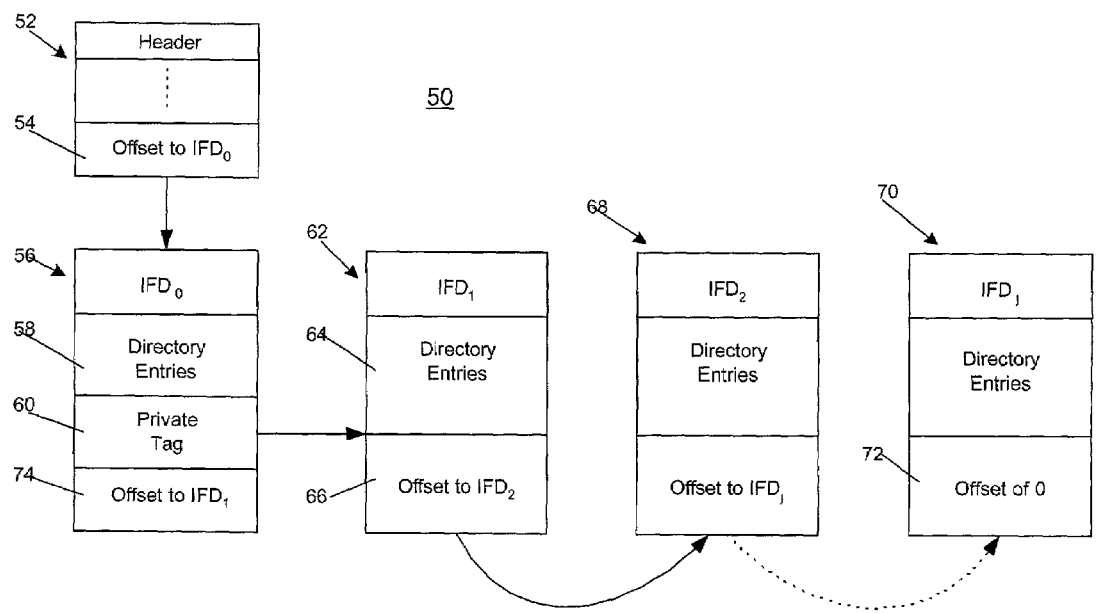
FIG. 2 illustrates an image file format data structure in accordance with the described implementations of the present invention.

The publishing tool 18, in which the program code for processing input page files 16'a, b, c, 20a, b, c and generating pages 22a, b, c, generates output pages 20a, b, c in a TIFF file implementation illustrated in FIG. 2 that stores halftone and/or gray scale bit maps of the page. A TIFF file contains one or more image file directories (IFD) that include information on a bit map representing a page in a document. In current art, a TIFF file maintains an IFD for each bit map representation of a page, either halftoned or gray scale, in a document included in the TIFF. A TIFF file may include a bit map for one or more pages from a document. Details of the TIFF format are described in the publication "TIFF, Revision 6," (Copyright Adobe Systems, Inc., 1986–88, 1992), which publication is incorporated herein by reference in its entirety.

In the described implementations, the TIFF file 50 may maintain multiple bit maps for each page in a document or, alternatively one or more bit maps for only one page of the multi-page document. For instance, with respect to FIG. 2, $IFD_0$ may maintain information on a halftone bit map in the TIFF file for a page of a multi-page document, where the halftone may include both line art and/or continuous tone. The TIFF file 50 may further include one or more gray scale bit maps for the image regions within the page, wherein $IFD_1$ would include information on a gray scale bit map of a first image in the page. Information on (j−1) additional gray scale bit maps in the TIFF file 50 for further images on the page may be maintained in $IFD_2$ to $IFD_j$. In this way, the TIFF file implementation maintains a halftone and IFD for each page, including a halftone of both line art and any continuous tone images, and additional associated IFDs and gray scale bit maps for each image region within the page.

FIG. 2 illustrates how IFDs, text, and images are maintained in a TIFF file 50 in accordance with the described implementations of the present invention. In FIG. 2, the TIFF file 50 maintains bit maps for one page. An image file header 52 includes a pointer or offset 54 to the first $IFD_0$ 56, including directory entries 58 on the location of a halftone of the contents, i.e., line art and/or continuous tone, of the first page in the TIFF file 50. The IFDs of the preferred embodiments include a private tag 60 which indicates whether any gray scale bit maps are maintained for the page and a pointer to the $IFD_1$ for the first gray scale bit map for the page. As discussed, one or more gray scale bit maps may be provided for each page if the page contains one or more images. A private tag indicates information allocated in a private number range that is registered with a TIFF administrator and is meaningful to the particular organization defining the private tags. In preferred embodiments, the private tag is used to indicate IFDs for one or more gray scale bit maps for a particular page, and a pointer to the IFD for the gray scale bit map.

In FIG. 2, the private tag 60 in the first $IFD_0$ points to $IFD_1$ 62, which includes directory entry 64 information on a first gray scale bit map of a continuous tone image within the first page. If there are additional gray scale bit maps maintained for the first page, then $IFD_1$ 62 would include, as shown in FIG. 2, an offset 66 to $IFD_2$ 68 including information on a second gray scale bit map of a continuous tone section of the page. Additional IFDs may be maintained for any additional gray scale images maintained for the page. The final jth $IFD_j$ 70 would include a value of zero for the offset 72, indicating that there are no further gray scale images maintained for the page.

In the described implementations, a TIFF file may maintain, for each page, a halftone image of the entire contents of one page, including line art and continuous tone, and gray scale bit maps for each image within a page. This allows a single TIFF to maintain device dependent information, i.e., the halftone bit map, and device independent information, the gray scale bit maps, for each page. Such TIFF files may be archived pages of a book or larger document maintained in the storage system 8. In the above described implementations, only one page of a multi-page document is maintained in each TIFF file, thus requiring multiple TIFF files for a multi-page document. In additional implementations, a single TIFF file may maintain halftone and/or gray scale bitmaps for multiple pages in the manner described in the commonly assigned and co-pending patent application entitled "Image File Format for Storing Graphical Matter and Related Information", having U.S. application Ser. No. 09/323,163 and filed on May 27, 1999, which patent application is incorporated herein by reference in its entirety. In implementations where a single TIFF file maintains the bitmaps for multiple pages, the base IFD for the first page includes offset information indicating the location of the next base IFD for the halftone of the second page. Each subsequent page may include pointers to further bitmaps for each page and a pointer in the base IFG to the IFD of the next page. Each IFD further includes orientation information indicating the positioning within the page of the image represented by the bit map associated with the IFD.

FIG. 3 illustrates logic implemented in the publishing tool 18 to process input pages in a halftone or gray scale format to produce output TIFF files providing representations of the document pages. Control begins at block 100 with a user invoking the publishing tool 100. The publishing tool 100 receives (at block 102) user selection of N input files comprising halftoned pages of a document from the scanner 16'a, b, c or storage 8 20a, b, c that are halftoned and optimized for a specific printer. As discussed, using another printer type to render the halftone generated for a different printer may yield undesirable output results, such as moire effects. The user may specifically designate the input pages of the document. Alternatively, an index or document ticket may be provided that provides an ordered list of the halftone representations of each page of the document. The publishing tool 100 then performs the loop at blocks 104 to 136 for each user specified page i of the document.

At block 106, the publishing tool 18 processes page i and performs (at block 106) a segmentation operation to determine the image and text areas of page i. The publishing tool 18 may use any technique known in the art to segment the image and text regions of the page, such as a segmentation technique based on gradient information. Details of implementations for the segmentation algorithm utilized by the publishing tool 18 are described in the co-pending and commonly assigned patent application entitled "Method and Apparatus for Repurposing Binary Images", having U.S. application Ser. No. 09/110,900, filed on Jul. 6, 1998, which patent application is incorporated herein by reference in its entirety. The gradient segmentation technique determines the halftone areas as those regions containing more transitions between black and white values than text areas. Thus, the image sections may be deemed those to have a higher gradient activity per unit area.

The publishing tool 18 then determines (at block 108) the m bounded areas of each image area on page i. The publishing tool 18 may utilize a clustering technique, such as that described in the patent application "Method and Apparatus for Repurposing Binary Images", having U.S. application Ser. No. 09/110,900, incorporated by reference above, that determines rectangular or other shaped areas of the image areas. Those regions outside of the image area comprise text.

At block 112, the publishing tool 18 creates (at block 112) IFD0 for a TIFF file to include information on the received halftone of the entire page i and its location in the TIFF file. If there are images on the page (at block 114), then the publishing tool 18 sets (at block 118) the private tag 60 in IFD0 to include an offset 74 to IFD1 for the first image on page i. If there are no images on page i, then the private tag in IFD0 is set (at block 116) to zero.

If there are images in page i, then from block 118, the publishing tool 18 proceeds to perform the loop beginning at block 120 for each image j in page i, where j extends from 0 to m. The publishing tool 18 accesses image j on page i and then descreens (at block 122) the halftone of the image j to generate a grey scale or intermediate grey scale representation of the image in a manner known in the art. For instance, the publishing tool 18 may utilize the descreening process described in the patent application "Method and Apparatus for Repurposing Binary Images", having U.S. application Ser. No. 09/110,900, incorporated by reference above, which discloses a technique for descreening screened halftone images. Such descreening techniques may involve the use of a boxcar filter or Gaussian blur. Further details of the segmentation and descreening processor for halftone images are also described in the publication entitled "Descreening Printer-Ready Images", by A. R. Rao, Frederick Mintzer, Gerhard Thompson, IS&T's NIP 14: 1998 International Conference on Digital Printing Technologies, pgs. 285–289 (Copyright 1998), which publication is incorporated herein by reference in its entirety. The output of the descreening process is an intermediate grey scale image that does not contain any halftone screen. After generating the descreened gray scale representation of image section j, the publishing tool 18 adds (at block 124) information on image j in IFDj, including the location of the gray scale bit map for image j in the TIFF file and orientation information on where to orient image j within page i. The mixed format TIFF file providing information to reproduce page i may then be stored (at block 134) in storage 8. If (at block 126) there is another image on page i, then the publishing tool 18 adds (at block 130) offset information pointing to IFDj+1 for the next image (j+1) and then proceeds back (at block 132) to block 120 to perform another iteration of the loop for the next image. If there are no further images, then the publishing tool 18 sets (at block 128) the offset information to zero and proceeds (at block 136) to process the next (i+1) to generate the mixed format TIFF file for the next page of the document.

In this way, a TIFF file including a halftone bit map provides a halftone of the entire image that is suitable for generating the text on different printers. The TIFF file further includes gray scale bit maps for each image on a page to allow for use with different printers in a manner that produces desirable output. The TIFF files for each page of the document may then be later retrieved and printed on any type of printer device because the image sections may be halftoned and rendered directly from the gray scale representation of the image.

Figure 4A:
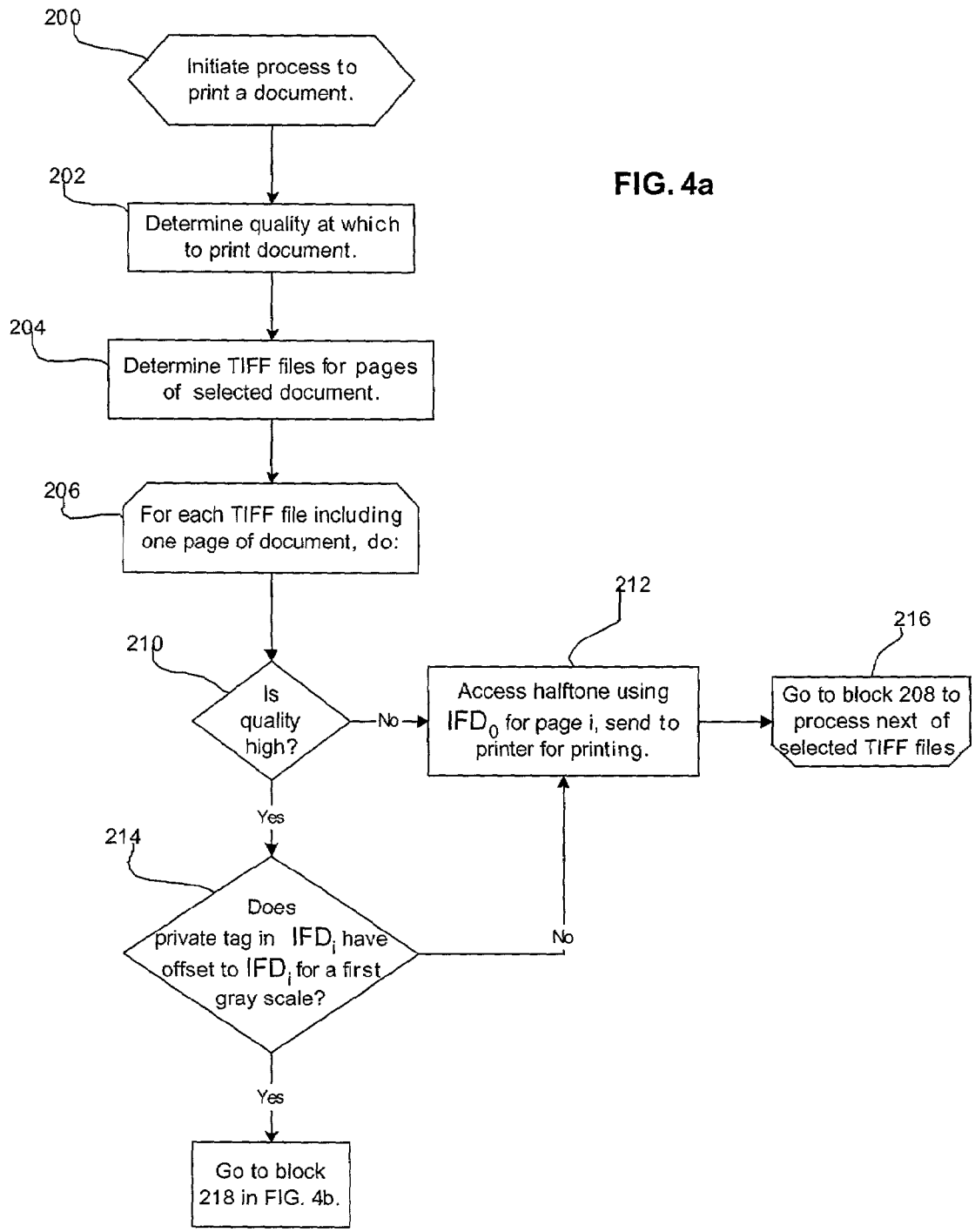
FIGS. 4a, b illustrate logic to process an image file to print a document in accordance with preferred embodiments of the present invention.

FIGS. 4a, b illustrate logic implemented within the publishing tool 18 to process a request to access and print the mixed format TIFF files, generated according to the logic of FIG. 3. The printing process to print a document archived in the storage system 8 in TIFF files 20a, b, c begins at block 200 in FIG. 4a. The publishing tool 18, through a graphical user interface (GUI), allows the user to select a print quality for the print job, such as high or low. The low quality may be used to proof the job to observe the general layout of the printed document. High quality is used for the final print job. The publishing tool 18 determines (at block 202) the quality the user selected, i.e., high or low. The publishing tool 18 then determines (at block 204) the TIFF files including pages for the selected document. As discussed halftone and gray scale bit maps representing each page in a document may be archived in multiple TIFF files 20a, b, c.

The publishing tool 18 then proceeds to begin a loop (at block 206) for each TIFF file 20a, b, c of the selected document. If (at block 210) the user did not select a high print quality, then the publishing tool 18 accesses (at block 212) the halftone bit map described in $IFD_0$ and sends the halftone bit map to the printer 12 for printing. Thus, the halftone bit map is used to print the page for the selected TIFF, regardless of whether the TIFF includes both text and image(s), i.e., continuous tone. From block 212, the printer server proceeds to block 216 to process any further TIFF files including page data for the document by performing another iteration of the loop beginning at block 206. If the print quality is high, then the publishing tool 18 determines (at block 214) whether the private tag for $IFD_0$ has an offset pointing to one or more IFDs providing information on gray scale bit maps associated with the TIFF file for image sections of the page. If there are no gray scale bit maps for image regions in the page, then the publishing tool 18 sends (at block 212) the halftone bit map indicated in $IFD_0$ to the printer 12 for printing. In this case, the page represented in the selected TIFF file does not include any continuous tone, so that the halftone bit map can produce high quality line art, such as text.

Figure 4B:
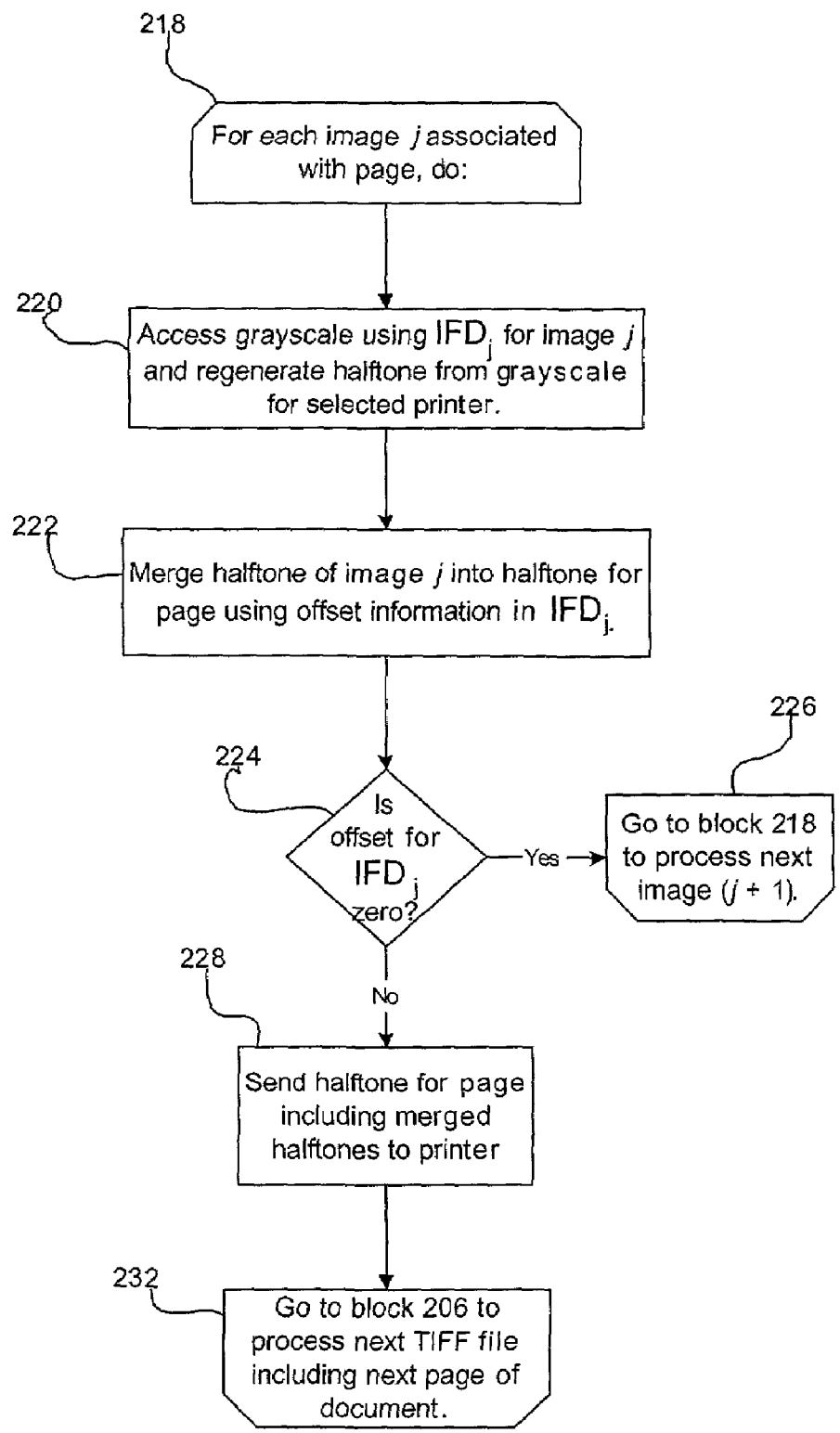

If the private tag points to a chain of one or more IFDs beginning at IFD1, then the publishing tool 18 begins a loop (at block 218, in FIG. 4b) for each image j associated with the page. As part of this loop, at block 218, the publishing tool 18 accesses (at block 220) the gray scale representation of image j using IFDj and halftones the gray scale bit map for image j using any halftone technique known in the art, such as halftoning with a dithering mask. The gray scale bit map would be halftoned to optimize the output for the printer 12 selected to print the document represented in the TIFF files 20a, b, c. The publishing tool 18 then merges (at block 222) the halftone bit map generated for image j into the halftone for page i, described in IFD0. The publishing tool 18 would use the orientation information maintained in the IFDi,j for image j to merge the halftone bit map of the image j into the correct location in page i. After merging the halftone for image j into the halftone for the page, the publishing tool 18 determines (at block 224) whether the offset for IFDj indicates a further image (j+1) for the current page. If so, the publishing tool 18 proceeds (at block 226) to perform another iteration of the loop beginning at block 218 to halftone the next image (j+1) and merge such halftone into the current halftone for page. Thus, the halftone for the page may have multiple levels of halftone bit maps merged therein. If (at block 224) there are no further images for the page to merge into the combined halftone for the page, then the publishing tool 18 sends (at block 228) the generated combined halftone bit map for the page, which may include multiple levels of merged halftones, to the printer 12 for printing. The publishing tool 18 then proceeds (at block 232) back to block 206 to process any further TIFF files including additional pages for the selected document.

The described implementations provide a technique for managing the input files for a print job that minimizes the use of human labor because the processing, segmentation, and rendering of the pages is handled by the publishing tool 18 automatically. Further, performance and output is optimized, because the mixed format TIFF files 20a, b, c may be used to produce quality output on different printers as the image portions of the pages are maintained as a gray scale bit maps. In this way, the TIFF file format includes both device dependent data, such as the halftone of a page, and device independent data, such as the gray scale of the continuous tone images in the page. If the user desires to print at a low quality for proofing purposes and speed, then the publishing tool 18 will transmit the already transformed halftone bit map representations of the pages, including line art and/or continuous tome, to the printer 12 for printing. This process will maximize printing performance and minimize use of processor cycles as the publishing tool does not have to transform, e.g., halftone or RIP, any gray scale bit maps for the image regions. However, if a high quality print job is selected, then the publishing tool will use the device independent data and transform the gray scale bit maps to halftones and merge the regenerated halftone bit maps into the halftone of the page to allow for high quality rendering of the continuous tones within the page.

With these described implementations, publishers do not have to manually rescan pages in the document including continuous tone as the device independent gray scale bit map of the images is maintained in the TIFF file format of the preferred embodiments. Further, the publishing tool automatically handles the image and text sections of a page to provide optimal output. Although maintaining gray scale representations of the images increases processing time, with the described implementations, both the quality of the output as well as processing time is optimized because only those pages having continuous tone are descreened and stored as a gray scale bitmap that must be rasterized later. For those pages including only text or line art, the saved halftone is sent to the printer without having to perform the costly transformation processes. A halftone of line art or text alone usually can print at high quality on any printer. Thus, use of processor cycles to transform gray scales is minimized by halftoning only those pages that need to be halftoned again to ensure the selected high quality of print output.

Further, different compression techniques may be used for different components in the TIFF file, depending on whether the IDF indicates the component to be a halftone or gray scale bit map. The gray scale bit maps in a TIFF file may be compressed using compression algorithms particularly suited for compressing continuous tone, such as JPEG or Lossy. The halftone images in the TIFF file may be compressed using LZW or another Lossless algorithm. This insures that compression for both the halftone and gray scale components are maximized, thereby minimizing the storage space needed to archive the pages. The preferred embodiment TIFF file further minimizes use of storage space because gray scales are only maintained for those pages that include continuous tone images; gray scales are not maintained for pages that only include text or line art. This minimizes the number of gray scale bit maps archived, and hence minimizes storage space as gray scale bit maps require substantially more storage space than halftoned bi-level bit maps.

Following are some alternative implementations for accomplishing the present invention.

The described implementations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The printer server 6, storage system 8, workstation 4, and printer 12 may be implemented in many types of computing environments, such as a network printing environment where the network 14 provides communication between the devices 4, 8, 12. Alternatively, the printer server 4 and storage system 8 may be included in a single desktop workstation, such as a personal computer or workstation, that is connected to the printer 12 via a parallel port. Numerous other configurations are also possible.

The printer 12 may be a contone printer or bilevel printer. A contone printer uses a combination of dithering and printing at different levels of intensity to produce different colors and different shades of lightness and darkness. Unlike a true continuous-tone printer, contone printers can dispense toner at only a few different levels of intensity. To produce the full range of colors that can be perceived by the human eye, they must also use dithering techniques.

In the logic described with respect to FIG. 3, the input files included halftoned screened digitized images. In alternative implementations, the received input files may comprise gray scale images in a device independent format. In such case, the publishing tool 18 could halftone the entire page to allow for reproduction of text and line graphics, and then maintain the gray scale representations of image sections within the page to save for later halftoning for a particular printer. This described process reduces the space needed to store the data for the page and, at the same time, allow for high quality reproduction on all printers because only the image sections are stored in the gray scale format, which requires substantially more space than the halftoned image.

The described implementations were discussed with respect to line art and continuous tone graphics data types. However, the documents processed may include any type of digital information for rendering graphics matter, such as text, line art, continuous tone, images, etc.

The implementations were described with respect to graphics input that comprised pages of a document or book. However, the preferred image file formats may be used to maintain data for any type of graphics input including information on graphics matter, regardless of the format in which the graphics matter is stored, i.e., pages, etc.

In the described implementations, the pages the publishing tool receives as input are stored in a file per page. Additionally, the input files received may include multiple pages of a document. Further, the output in the TIFF file format described with respect to FIG. 2 may include the content for one or more pages. Still further, the number of output files including the document pages may differ from the number of input files including the document pages in the device dependent file format if pages are combined in the output files in a manner that is different than how the pages are dispersed throughout the input files.

The above discussed implementations were described with respect to producing an output file for printing. However, those skilled in the art will appreciate that the preferred embodiments may be used to produce graphics output for any type of output device, including printers, plotters, display monitors, lithography machines, three dimensional modeling machines, etc.

The discussed implementations describe storing in the TIFF file either gray scale bit maps, which includes both color and shades of gray, and halftone bit maps. Those skilled in the art will appreciate that the file format of the preferred embodiments may store print image files in any type of file format, such as vector formats, PostScript™**, other bit mapped formats, and any other graphics file format known in the art, e.g., CGM, DXF, EPS, GEM, HPGL, IGES, PIC, PICT, WMF, etc.

**TIFF and PostScript are trademarks of Adobe Systems Inc.; IBM, AIX, OS/2, and RS/6000 are registered trademarks of IBM and OS/390, INFOPRINT, and MVS are trademarks of IBM; WINDOWS is a registered trademark of Microsoft Corporation; UNIX is a registered trademark licensed by the X/Open Company LTD.

The described implementations of the device independent images utilized a gray scale format and the device dependent images utilized a bi-level format. In alternative implementations, the device independent formats typically had more possible bit values per pixel than the device dependent format. However, in alternative embodiments, the device dependent format may have the same number or more possible bit values per pixel as the device independent format. Moreover, the device dependent and device independent formats may represent the image in different color spaces. For instance, for color images, the device independent format may be maintained in as a CIE-Lab color space format, and the device dependent format may represent an image in a Cyan-Magenta-Yellow-Black (CMYK) color space that is a transformation of the CIE-Lab device independent image to the CMYK device dependent color space supported by the printer.

In the described implementations, the file including the device dependent and device independent data structures providing representations of printed matter on a page are maintained in a single file, e.g., a single TIFF file. In further embodiments, the device dependent and device independent data structures may be maintained in multiple files, wherein the files include information to relate the separate files and device dependent and device independent data structures therein to accomplish the purposes of this invention.

The TIFF implementation is described as providing input for a printer. However, those skilled in the art will appreciate that in alternative implementations the image file format may maintain graphic information for any output device, including any type of printers, display monitor or any other display medium capable of displaying graphical images.

The described implementations maintained multiple types of print image file formats in a file in the TIFF format. Additionally, alternative file formats known in the art may be used to provide both device dependent and device independent print image files in the same file. Preferably, the device independent files are used to store print matter that needs to be transformed for the specific printer in order to print at a high quality, such as continuous tone images, and the device dependent files are used to store print matter that does not need to be transformed for each specific printer to print at a high quality, such as text or line art. One advantage of this file format is that the number of device independent files maintained in the print file, which typically require more space than the device dependent files, is minimized as the print file only includes device independent files for print matter, i.e., the image sections, that must be transformed for a specific printer to print at a high quality. Further, device independent files typically require significantly more processing, which degrades printer performance, than device dependent files before they are ready for printing. Thus, the preferred file formats further maximize printer performance by minimizing the processing cycles used to transform print device independent files. Print matter that does not need to be completely transformed in order to print at a high quality on different printers is maintained in device dependent files, which require substantially less transformation processing than device independent files.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing a multi-page document, comprising:

receiving a plurality of input files including digital representations of multiple pages of a document, wherein the content of each entire page is represented in a first representation format, wherein the entire page content is capable of including content of a first content type and second content type;

for each page of the document represented in the input files, performing:

(i) determining regions in the page including content of the second content type;

(ii) processing each determined region in the page to generate the content for each region in a second representation format; and (iii) adding the content of the entire page in the first representation format and the content of each region in the second representation format to at least one output file; and (iv) storing the at least one output file.

2. The method of claim 1, wherein the first content type comprises text and line art and wherein the second content type comprises a continuous tone image.

3. The method of claim 1, wherein the first representation format comprises a device dependent image format and the second representation format comprises a device independent image format.

4. The method of claim 3, wherein the device dependent format comprises a halftone image format and the device independent format comprises a grey scale image format.

5. The method of claim 4, wherein processing each determined region in the page to generate content in the gray scale format comprises descreening the halftone format of the determined region in the page to generate the determined region in the gray scale image format.

6. The method of claim 1, wherein each output file is capable of including content in the first and second representation formats for one page.

7. The method of claim 1, wherein each output file is capable of including content in the first and second representation formats for a plurality of pages.

8. The method of claim 1, further comprising:

selecting the output files to render; and for each page of the document represented in the selected output files, performing:

(i) accessing the content of the entire page in the first representation format;

(ii) accessing the content for each region in the page in the second representation format;

(iii) processing the content for each region in the page in the second representation format to generate the content for each region in the first representation format;

(iv) merging the content for the entire page and the content for each region in the first representation format into page output in the first representation format; and (v) rendering the page output for each page into a human observable format.

9. The method of claim 8, wherein each output file includes one data structure for the content of the entire page in the first representation format and one additional data structure of the content for each determined region in the second representation format.

10. The method of claim 9, wherein the output file comprises a Tagged Image File Format (TIFF) file and wherein information on each data structure is maintained in an image file directory (IFD).

11. The method of claim 8, further comprising:
determining if a high quality option is selected, wherein the step of processing the content for each region in the second representation format to generate the content for each region in the first representation format and merging the content for the entire page and each page region is only performed if the high quality option is selected.

12. The method of claim 11, further comprising:
rendering the content of the entire page in the first representation format if the high quality option is not selected.

13. The method of claim 8, wherein each region in the page in the second representation format is processed to generate the content for each region in the first representation format in a manner that optimizes the generated content in the first representation format for rendering on one of multiple output devices.

14. The method of claim 1, wherein the multi-page document is managed in a printing system.

15. The method of claim 1, wherein the multi-page document is managed within a network publishing system to archive the document for later rendering on one of multiple network printing devices.

16. A system for managing a multi-page document, comprising:
means for receiving a plurality of input files including digital representations of multiple pages of a document, wherein the content of each entire page is represented in a first representation format, wherein the entire page content is capable of including content of a first content type and second content type;
means for performing for each page of the document represented in the input files:
(i) determining regions in the page including content of the second content type;
(ii) processing each determined region in the page to generate the content for each region in a second representation format;
(iii) adding the content of the entire page in the first representation format and the content of each region in the second representation format to at least one output file; and
(iv) storing the at least one output file.

17. The system of claim 16, wherein the first content type comprises text and line art and wherein the second content type comprises a continuous tone image.

18. The system of claim 16, wherein the first representation format comprises a device dependent image format and the second representation format comprises a device independent image format.

19. The system of claim 18, wherein the device dependent format comprises a halftone image format and the device independent format comprises a grey scale image format.

20. The system of claim 19, wherein the means for processing each determined region in the page to generate content in the gray scale format descreens the halftone format of the determined region in the page to generate the determined region in the gray scale image format.

21. The system of claim 16, wherein each output file is capable of including content in the first and second representation formats for one page.

22. The system of claim 16, wherein each output file is capable of including content in the first and second representation formats for a plurality of pages.

23. The system of claim 16, further comprising:
means for selecting the output files to render; and
means for performing for each page of the document represented in the selected output files:
(i) accessing the content of the entire page in the first representation format;
(ii) accessing the content for each region in the page in the second representation format;
(iii) processing the content for each region in the page in the second representation format to generate the content for each region in the first representation format;
(iv) merging the content for the entire page and the content for each region in the first representation format into page output in the first representation format; and
(v) rendering the page output for each page into a human observable format.

24. The system of claim 16, wherein each output file includes one data structure for the content of the entire page in the first representation format and one additional data structure of the content for each determined region in the second representation format.

25. The system of claim 24, wherein the output file comprises a Tagged Image File Format (TIFF) file and wherein information on each data structure is maintained in an image file directory (IFD).

26. The system of claim 25, further comprising:
means for determining if a high quality option is selected, wherein processing the content for each region in the second representation format to generate the content for each region in the first representation format and merging the content for the entire page and each page region is only performed if the high quality option is selected.

27. The system of claim 26, further comprising:
means for rendering the content of the entire page in the first representation format if the high quality option is not selected.

28. The system of claim 23, wherein each region in the page in the second representation format is processed to generate the content for each region in the first representation format in a manner that optimizes the generated content in the first representation format for rendering on one of multiple output devices.

29. The system of claim 16, wherein the multi-page document is managed in a printing system.

30. The system of claim 16, wherein the multi-page document is managed within a network publishing system to archive the document for later rendering on one of multiple network printing devices.

31. A computer readable medium storing a program executable by a computer to manage a multi-page document by:
   receiving a plurality of input files including digital representations of multiple pages of a document, wherein the content of each entire page is represented in a first representation format, wherein the entire page content is capable of including content of a first content type and second content type;
   for each page of the document represented in the input files, performing:
      (i) determining regions in the page including content of the second content type;
      (ii) processing each determined region in the page to generate the content for each region in a second representation format;
      (iii) adding the content of the entire page in the first representation format and the content of each region in the second representation format to at least one output file; and
      (iv) storing the output file.

32. The computer readable medium defined in claim 31, wherein the first content type comprises text and line art and wherein the second content type comprises a continuous tone image.

33. The computer readable medium as defined in claim 31, wherein the first representation format comprises a device dependent image format and the second representation format comprises a device independent image format.

34. The computer readable medium as defined in claim 33, wherein the device dependent format comprises a halftone image format and the device independent format comprises a grey scale image format.

35. The computer readable medium as defined in claim 34, wherein processing each determined region in the page to generate content in the gray scale format comprises descreening the halftone format of the determined region in the page to generate the determined region in the gray scale image format.

36. The computer readable medium as defined in claim 31, wherein each output file is capable of including content in the first and second representation formats for one page.

37. The computer readable medium as defined in claim 31, wherein each output file is capable of including content in the first and second representation formats for a plurality of pages.

38. The computer readable medium as defined in claim 31, further comprising:
   selecting the output files to render; and
   for each page of the document represented in the selected output files, performing:
      (i) accessing the content of the entire page in the first representation format;
      (ii) accessing the content for each region in the page in the second representation format;
      (iii) processing the content for each region in the page in the second representation format to generate the content for each region in the first representation format;
      (iv) merging the content for the entire page and the content for each region in the first representation format into page output in the first representation format; and
      (v) rendering the page output for each page into a human observable format.

39. The computer readable medium as defined in claim 38, wherein each output file includes one data structure for the content of the entire page in the first representation format and one additional data structure of the content for each determined region in the second representation format.

40. The computer readable medium as defined in claim 39, wherein the output file comprises a Tagged Image File Format (TIFF) file and wherein information on each data structure is maintained in an image file directory (IFD).

41. The computer readable medium as defined in claim 38, further comprising:
   determining if a high quality option is selected, wherein processing the content for each region in the second representation format to generate the content for each region in the first representation format and merging the content for the entire page and each page region is only performed if the high quality option is selected.

42. The computer readable medium as defined in claim 41, further comprising:
   rendering the content of the entire page in the first representation format if the high quality option is not selected.

43. The computer readable medium as defined in claim 38, wherein each region in the page in the second representation format is processed to generate the content for each region in the first representation format in a manner that optimizes the generated content in the first representation format for rendering on one of multiple output devices.

44. The computer readable medium as defined in claim 31, wherein the multi-page document is managed in a printing system.

45. The computer readable medium as defined in claim 31, wherein the multi-page document is managed within a network publishing system to archive the document for later rendering on one of multiple network printing devices.

* * * * *